(12) United States Patent
MacKenzie et al.

(10) Patent No.: US 10,593,961 B2
(45) Date of Patent: Mar. 17, 2020

(54) ANODE PROTECTIVE DOPANTS FOR STABILIZING ELECTROCHEMICAL SYSTEMS

(71) Applicant: Imprint Energy, Inc., Alameda, CA (US)

(72) Inventors: John Devin MacKenzie, Lafayette, CA (US); Jesse Smithyman, Alameda, CA (US); Michael Coleman, Alameda, CA (US); Christine C. Ho, Fremont, CA (US)

(73) Assignee: Imprint Energy, Inc., Alameda, CA (US)

( * ) Notice: Subject to any disclaimer, the term of this patent is extended or adjusted under 35 U.S.C. 154(b) by 91 days.

(21) Appl. No.: 15/707,444

(22) Filed: Sep. 18, 2017

(65) Prior Publication Data

US 2018/0131012 A1     May 10, 2018

Related U.S. Application Data

(60) Provisional application No. 62/396,049, filed on Sep. 16, 2016.

(51) Int. Cl.
| | |
|---|---|
| *H01M 6/50* | (2006.01) |
| *H01M 10/42* | (2006.01) |
| *H01M 6/40* | (2006.01) |
| *H01M 4/38* | (2006.01) |
| *H01M 10/0569* | (2010.01) |
| *H01M 6/16* | (2006.01) |
| *H01M 6/18* | (2006.01) |
| *H01M 10/0565* | (2010.01) |
| *H01M 4/62* | (2006.01) |
| *H01M 10/0567* | (2010.01) |
| *H01M 10/0562* | (2010.01) |

(52) U.S. Cl.
CPC ............ *H01M 6/5072* (2013.01); *H01M 4/38* (2013.01); *H01M 4/381* (2013.01); *H01M 4/62* (2013.01); *H01M 4/628* (2013.01); *H01M 6/164* (2013.01); *H01M 6/168* (2013.01); *H01M 6/181* (2013.01); *H01M 6/40* (2013.01); *H01M 10/0565* (2013.01); *H01M 10/0567* (2013.01); *H01M 10/0569* (2013.01); *H01M 10/4235* (2013.01); *H01M 10/0562* (2013.01); *H01M 2300/0045* (2013.01)

(58) Field of Classification Search
None
See application file for complete search history.

(56) References Cited

U.S. PATENT DOCUMENTS 9,276,292 B1 *   3/2016   MacKenzie ....... H01M 10/0567

* cited by examiner

*Primary Examiner* — Sarah A. Slifka
(74) *Attorney, Agent, or Firm* — Kwan & Olynick LLP

(57) ABSTRACT

The disclosure concerns an electrochemical cell including a cathode, an electrolyte, and an anode including an elemental metal or metal alloy. The electrolyte includes an electrolyte salt, an ionic liquid, and an optional first polymer binder. The electrolyte and/or the anode further includes a protective metal salt in an amount sufficient to (i) reduce or eliminate hydrogen evolution or open circuit side reactions in the electrochemical cell, or (ii) plate out onto or alloy with the anode metal or conductive additives in the anode. The electrochemical cell may further include a first current collector in contact with the cathode, and a second current collector in contact with the anode. The second current collector may include a metal or metal alloy. In such cells, the second current collector may further include the protective metal salt, and the protective metal salt may plate out onto or alloy with the metal or metal alloy of the second current collector.

20 Claims, 5 Drawing Sheets

ANODE PROTECTIVE DOPANTS FOR STABILIZING ELECTROCHEMICAL SYSTEMS

CROSS REFERENCE TO RELATED APPLICATION

This application claims the benefit of U.S. Provisional Patent Application No. 62/396,049, filed on Sep. 16, 2016, incorporated herein by reference as if fully set forth herein.

BACKGROUND OF THE INVENTION

Field Of The Invention

The present invention relates generally to electrochemical cells and systems, and more specifically to a dopant or other stabilizing agent that interacts with and/or protects the anode in the cell or system.

Description of Related Art

Certain metal additives can reduce hydrogen production or detrimental side reactions in electrochemical cells during storage or during their use to extend their charge retention time, shelf, or cycle life (see U.S. Pat. No. 3,639,176 and Huot et al., *Electrochem. Soc. Proc.,* 95-14, pp. 22-26, 1996). One degradation mechanism for electrochemical cells can be the splitting of water or deterioration of the electrolyte and associated hydrogen generation. In primary zinc alkaline cells, it is known that anode alloys containing Hg or Pb can reduce hydrogen generation, for example from decomposition of water or other electrolyte components in the cell (see U.S. Pat. No. 6,652,676). This effect can be seen through studies of the hydrogen evolution exchange current versus the metal-to-hydride binding energy (Quaino et al., *J. Nanotechnol.* 2014, 5, 846-854).

FIG. 1 is a graph of hydrogen exchange current (in $A/cm^2$) vs. hydride formation energy (in kcal/mol) in acidic solution. This graph shows the nature of metals such as Pb, Cd, Sn and Bi towards low hydrogen evolution, as compared to other metals such as Fe, Ir, Rh and Re.

Elements such as Hg and Pb have been alloyed into zinc anode materials to enhance charge retention, storage lifetimes and anode conductivity. Due to toxicity and environmental concerns, these elements were replaced with other elements such as Bi, Al and In. However, it can be difficult to source or produce these alloys in the appropriate particle size and/or with the desired alloy distribution (e.g., surface coating).

Corrosion of zinc can lead to self-discharge, shortened shelf life, reduced performance, cell gassing and other undesirable phenomena in an electrochemical cell. The key factors leading to zinc corrosion have been summarized into three main groups: 1) properties of the electrolyte, 2) properties of the zinc electrode and 3) operating conditions (X. Zhang, "Corrosion and Electrochemistry of Zinc," Plenum/Springer, New York, N.Y., 1996). Some empirical studies have shown that the presence of certain inorganic species or compounds in the electrolyte or electrode can significantly decrease rate of zinc corrosion. These species or compounds have been added to an electrochemical system in known ways.

This "Description of the Background" section is provided for background information only. The statements in this "Description of the Background" section are not an admission that the subject matter disclosed in this section constitutes prior art to the present disclosure, and no part of this "Description of the Background" section may be used as an admission that any part of this application, including this section, constitutes prior art to the present disclosure.

SUMMARY OF THE INVENTION

Aspects of the present invention concern an electrochemical cell and methods of making and protecting an electrochemical cell. The electrochemical cell includes a cathode, an electrolyte, and an anode comprising an elemental metal or metal alloy. The electrolyte includes an electrolyte salt, an ionic liquid, and an optional first polymer binder. The anode may further comprise an oxide of the elemental metal or metal alloy. The electrolyte and/or the anode further includes a protective metal salt in an amount sufficient to (i) reduce or eliminate hydrogen evolution or open circuit side reactions in the electrochemical cell, or (ii) plate out onto or combine with the anode metal, alloy, or (when present), oxide.

The electrochemical cell may further include a first current collector in contact with the cathode, and a second current collector in contact with the anode. The second current collector may include a metal or metal alloy. In such cells, the second current collector may further include the protective metal salt (e.g., in an amount sufficient to reduce or eliminate hydrogen evolution or one or more open circuit side reactions in the electrochemical cell), and the metal cation of the protective metal salt may plate out onto or alloy or combine with (i) the elemental metal, the metal alloy, or (when present) the oxide of the anode, or (ii) the metal or metal alloy of the second current collector.

In the present electrochemical cell, a cation exchange may occur between the protective metal salt and a cation of the electrolyte salt and/or the elemental metal cations of the anode. In some embodiments, the metal ions of the protective metal salt oxidize in a solution of the ionic liquid exposed to air, and provide a protective oxide in the anode or the electrolyte.

In various embodiments, the elemental metal or metal alloy of the anode comprises Zn, Li, Al, Ni or Cu. In other or further embodiments, the metal ions of the protective metal salt comprise or consist essentially of indium, bismuth, gallium, tin, aluminum or silver. In some embodiments, the anode comprises a porous elemental metal anode. For example, the porous elemental metal anode may comprise elemental metal particles.

In some embodiments, the protective metal salt may contain an anion identical or chemically similar to a component of the electrolyte, the second current collector or the second binder. Additionally or alternatively, the protective metal salt contains an anion identical or chemically similar to that of the ionic liquid or a second metal salt that is or was a component of the anode, the second collector or the electrolyte. In various examples, the protective metal salt comprises a bis(trifluoromethylsulfonyl)imide, bis(fluorosulfonyl)imide, methanesulfonate, trifluoromethanesulfonate, toluenesulfonate, bis(methylsulfonyl)imide, acetate, fluoroacetate or dichloroacetate of In, Bi, Sn, Ga or Al. Furthermore, the ionic liquid may comprise a cation selected from the group consisting of imidazolium, pyrrolidinium, pyridinium and tetraalkyl ammonium, and an anion selected from the group consisting of methanesulfonate, trifluoromethanesulfonate, toluenesulfonate, bis(methylsulfonyl)imide, bis(trifluoromethane)-sulfonimide, tetrachloroborate, tetraalkyl borate, tetraaryl borate, $C_1$-$C_{20}$ carboxylate, perchlorate and nitrate. In other or further embodiments, a cation of the protective metal plates onto the elemental metal or metal alloy of the anode when an electrical bias is applied to the electrochemical cell.

The electrochemical cell may further comprise a substrate, a first current collector in electrical contact with the cathode, and a second current collector in electrical contact with the anode. In such electrochemical cells, the plating, alloying and/or cation exchange may occur between a metal cation of the protective metal salt and a metal of the second current collector, the substrate or the anode.

In some embodiments, the anode may further comprise a second binder, and the protective metal salt dissociates into the second binder and/or the electrolyte. In other or further embodiments, the metal ions of the protective metal salt form an oxide on the anode. For example. the oxide on the anode comprises an intermetallic oxide of the elemental metal of the anode and the metal ions of the protective metal salt. In some embodiments, the anode includes an outer layer having a ratio of protective metal atoms to elemental metal atoms or metal alloy of 1:1 or greater.

In some examples of the present electrochemical cell, the electrolyte or the second binder contains the protective metal salt, the anode includes a surface oxide, and the cation of the protective metal salt is in the surface oxide. The cation of the protective metal salt may have an oxidation state that reduces the surface oxide of the anode.

In some additional or alternative examples of the present electrochemical cell, the cathode includes a metal oxide and a polymer binder linked to said metal oxide. The polymer binder may comprise a cross-linked polymer.

In general, the cathode comprises a first material providing a cathodic electric transport, charge storage or redox function, and/or the anode provides an anodic electric transport, charge storage or redox function. In some embodiments, at least one of the cathode and the anode further comprises the ionic liquid, the electrolyte salt, and/or a transport-enhancing additive. For example, each of the cathode, electrolyte, and anode may include the ionic liquid, the electrolyte salt and/or the transport-enhancing additive. For example, in some embodiments, the anode or current collector further comprises a conductive additive.

When the electrochemical cell further comprises (1) the first current collector in contact with the cathode and (2) the second current collector in contact with the anode, the electrochemical cell may further comprise an electrically insulative substrate in contact with one of the first current collector and the second current collector. In some embodiments, the electrochemical cell is a printed battery cell.

In various embodiments of the present electrochemical cell, at least one of the anode and the second current collector further includes a solid inorganic filler. The solid inorganic filler may be selected from the group consisting of silica, alumina, an aluminosilicate, titanium dioxide, zinc oxide, and combinations thereof. In such embodiments, at least one of the anode and the first and second current collectors may include a second polymer binder. The first and/or second polymer binder(s) may be selected from polymers, copolymers and/or rubbers of trifluoroethylene, tetrafluoroethylene, vinylidene difluoride hexafluoropropylene, styrene and/or butadiene.

In other or further embodiments of the present electrochemical cell, an anion of said electrolyte salt and/or said protective metal salt may form hydrogen bonds with said polymer binder. Furthermore, the (first or second) polymer binder may have a hydrophilicity or hydrophobicity similar or matched to that of the anion.

The electrolyte may further comprise an additive selected from the group consisting of carbonates, glycerol carbonates, glycols, sugar alcohols, glycerol, polyols, ethylene oxides, propylene oxides, polymers and copolymers of ethylene and propylene oxides, ethers, fluorinated carbonates, and fluorinated ethers in an amount of 0.001-10% by weight of the electrolyte. In other or further embodiments, either or both of the first and second polymer binders may comprise a polyester, a polyaniline, a polyether, a polyimide, or a polymer or copolymer of trifluoroethylene, tetrafluoroethylene, vinylidene chloride, an ethylene oxide, acrylic acid, methacrylic acid, and/or an acrylate and/or methacrylate ester, or a blend thereof.

In various embodiments, the electrolyte may further comprise a transport-enhancing species selected from the group consisting of carbonates, glycols, ethylene oxides, propylene oxides, polymers and copolymers of ethylene and propylene oxides, ethers, fluorinated carbonates, and fluorinated ethers, in an amount <10% by weight of the electrolyte. In other or further embodiments, at least one of the cathode, the anode, the electrolyte, and the first and second current collectors further comprises a solvent. The solvent may comprise a $C_1$-$C_4$ mono-, di- and/or trialkylamine, N-methylpyrrole, N-methylpyrrolidine, N-methylpyrrolidone, N-methylpiperidine, N-methylimidazole, pyridine, or an aqueous salt thereof.

In another aspect, the present invention relates to a method of protecting an electrochemical cell, comprising adding a protective metal salt to an electrolyte, an anode, or a current collector in electrochemical contact with the anode; causing ion exchange between a metal ion in the protective metal salt and a metal in the anode or current collector to occur; and plating the metal from the protective metal salt onto a surface of the anode or the current collector. Plating the metal from the protective metal salt onto the surface of the anode or the current collector may (i) reduce an electrical resistance of the anode or the current collector, respectively, or between particles of the porous elemental metal, or (ii) increase a mechanical robustness of the anode or current collector. The anode or the current collector may comprise a porous elemental metal, and the surface of the anode or the current collector includes an intergranular contact area onto which the metal from the protective metal salt plates. Furthermore, the metal cation of the protective metal salt may have an oxidation state that is higher than an oxidation state of a metal of the anode or current collector, and/or the metal cation of the protective metal salt may have a larger size than a size of the metal of the anode or current collector, such that when the ion exchange occurs, a volumetric amount of the metal of the protective metal salt that is plated is larger than a volumetric amount of the metal of the anode or current collector that is lost.

In some embodiments of the present method of protecting an electrochemical cell, plating the metal from the protective metal salt onto the surface of the anode or current collector results in the anode or current collector having an improved electrical conductivity and/or a lower resistance. In other or further embodiments, the anode or current collector may further comprise a conductive additive.

In some embodiments of the present method of protecting an electrochemical cell, the metal of the anode or current collector includes a surface oxide, and the ion exchange incorporates metal cations from the protective metal salt in the surface oxide. In such embodiments, the surface oxide with the metal cations incorporated therein is a conductive metal oxide. For example, the conductive metal oxide may comprise $In_2O_3$:Zn or ITO (indium tin oxide).

In various embodiments of the present method of protecting an electrochemical cell, the conductive metal oxide has a substantially lower resistivity than an oxide of the metal of the anode or current collector. In such embodiments, the conductive metal oxide may reduce an interparticle resistance of the anode or current collector, and/or the metal of the anode or current collector may comprise Zn, Ga, or Ni.

In some embodiments of the present method of protecting an electrochemical cell, the protective metal salt comprises a metal ion that reduces a melting point of the metal of the anode or current collector when alloyed therewith. For example, the protective metal salt may facilitate particle-to-particle contact sintering, reduce particle-to-particle resistance, and/or inhibit an increase in resistance of the anode or current collector over time. In such embodiments, the protective metal salt may comprise Sn, Ga, or In.

The method of protecting an electrochemical cell may further comprise adding a second protective metal salt to the electrolyte, anode, or current collector. A first one of the protective metal salts may comprise a metal ion that reduces a melting point of the metal of the anode or current collector when alloyed therewith, and a second one of the protective metal salts may comprise a metal ion that reduces gas formation in the electrochemical cell. The second protective metal salt may minimize gas formation and oxidation of the metal of the anode or current collector and/or increase a conductivity of the anode or current collector. In embodiments including the second protective metal salt, the metal ions of the first and second ones of the protective metal salts are generally different.

In various embodiments of the present method of protecting an electrochemical cell, adding the protective metal salt to the electrolyte, anode, or current collector may comprise mixing the protective metal salt(s) with particles of the metal of the anode or current collector. The protective metal salt(s) may be mixed in amounts or in surface energies that (i) promote relatively selective plating of the metal of the protective metal salt(s), or (ii) cause a high concentration of the metal of the protective metal salt(s) in an alloy with the metal of the anode or current collector, at contact points between the particles. The contact points may be areas in which the available surface area of the particles is higher than other areas of the particles. Additionally or alternatively, the contact points may be surfaces of two of the particles in close proximity to each other.

In certain examples, the protective metal salt(s) comprise indium triflate or tin triflate. In other or further examples, the anode comprises a metal alloy. The metal alloy may provide an initial surface with the metal of the protective metal salt therein, in which case the metal alloy may minimize initial self-discharge of the electrochemical cell and/or provide a reservoir or buffer of metal ions of the protective metal salt such that the protective metal salt is present in an effective concentration at the anode or current collector over a plurality of charge and discharge cycles.

In various embodiments of the present method of protecting an electrochemical cell, a higher concentration of the protective metal salt is present in the anode or current collector than in the electrolyte. The higher concentration of the protective metal salt in the anode or current collector may result in more of the metal of the protective metal salt plating onto the anode or current collector than would be achieved with the higher concentration of the protective metal salt being present in the electrolyte.

The present method of protecting an electrochemical cell may further comprise adding a chelating agent or ligand that chelates or ligates to the metal ion of the protective metal salt. The chelating agent or ligand may provide a reservoir of the metal ions of the protective metal salt and/or buffers, or sustain the concentration of the metal ions of the protective metal salt at surfaces of the anode or current collector over time and/or over repeated discharge and charge cycles.

The present method of making an electrochemical cell comprises forming one of a cathode layer and an anode layer on or over a substrate (e.g., of the electrochemical cell), forming an electrolyte in contact with the cathode or anode, and forming the other of the cathode and the anode in contact with the electrolyte, but not in contact with the one of the cathode and the anode. The electrolyte comprises an electrolyte salt, an ionic liquid, and an optional first polymer binder. As with the electrochemical cell, at least one of the electrolyte and the anode includes a protective metal salt in an amount sufficient to (i) reduce or eliminate hydrogen evolution or one or more open circuit side reactions in the electrochemical cell, or (ii) plate out onto or combine with the elemental metal, the metal alloy, or when present, the metal oxide of the anode. The anode may comprise an elemental metal or metal alloy, and optionally an oxide of the elemental metal or metal alloy. The method may further comprise forming the cathode or anode on a first current collector, and forming a second current collector in contact with the other of the cathode and the anode. The current collector in contact with the anode may comprises a metal or metal alloy, and may include the protective metal salt. In embodiments including current collectors, the protective metal salt may be present in the cell in an amount sufficient for the metal cation thereof to plate out onto or combine with the elemental metal, metal alloy or metal oxide of the anode or the metal or metal alloy of the second current collector (and/or to reduce or eliminate hydrogen evolution or one or more open circuit side reactions in the electrochemical cell).

The method of making an electrochemical cell may further comprise forming or producing a protective metal or metal oxide film on at least one of the anode and the current collector in contact with the anode by exposing the anode and/or the second current collector to a metal cation of the protective metal salt. The one of the cathode and the anode may be formed in a layer on the first current collector, the electrolyte may be formed in a layer on the one of the cathode and the anode, the other of the cathode and the anode may be formed in a layer on the electrolyte, and the second current collector may be formed in a layer on the other of the cathode and the anode. For example, the anode may be formed by printing particles of the elemental metal, the electrolyte, the ionic liquid and the binder. In other or further embodiments of the method of making an electrochemical cell, the anode or current collector may further comprise a conductive additive.

In some embodiments, the protective metal salt includes an anion identical or chemically similar to an anion of the electrolyte salt or ionic liquid. Ion exchange may occur between the metal cation of the protective metal salt and the elemental metal or metal alloy of the anode and/or the metal or metal alloy of the current collector in contact with the anode. In various examples, the protective metal salt may comprise a metal selected from In, Sn, Al, Bi and Ga, the elemental metal or metal alloy of the anode may comprise Zn, Ni, Cu or Li, and/or the anion of the protective metal salt may be selected from methanesulfonate, trifluoromethanesulfonate, toluenesulfonate, bis((methyl)sulfonyl)imide and bis(trifluoromethane)sulfonimide.

The method of making an electrochemical cell may further comprise applying a bias to the electrochemical cell to plate a cation of the protective metal onto the elemental metal or metal alloy of the anode or the metal or metal alloy of the second current collector. In such embodiments, the bias may be applied during a layer-forming or cell charging step. In other or further embodiments, the anode may include an outer layer having a ratio of protective metal atoms to elemental metal or metal alloy atoms of from 1:1 to 100:1. In such embodiments, when the bias is applied, the metal ions of the protective metal salt may be discharged from the elemental metal or metal alloy of the anode or the metal or metal alloy of the second current collector into the anode, a binder in the anode, the current collector in contact with the anode, or a binder in the current collector in contact with the anode.

In various embodiments of the method of making an electrochemical cell, forming the electrolyte comprises printing the electrolyte. For example, printing the electrolyte may comprise printing an ink including the components of the electrolyte in a volatile solvent. In further embodiments, forming the cathode and/or the anode may comprise printing the respective cathode and/or anode, forming the first current collector comprises printing the first current collector, and/or forming the second current collector comprises printing the second current collector.

In some embodiments, the protective metal ion salt dissolves into an ink for forming one of the components of the electrochemical cell, a binder in one of the components of the electrochemical cell, or the electrolyte, and/or the method further comprises heating or otherwise thermally treating the electrochemical cell to plate the metal cation of the protective metal salt onto the anode or the current collector in contact with the anode, and/or form an oxide on the anode or the current collector in contact with the anode.

The method of making an electrochemical cell may further comprise drying the electrolyte at a temperature and for a length of time sufficient to remove substantially all of the volatile solvent from the ink. For example, the volatile solvent may have a boiling point of <150° C.

Further aspects of the electrochemical cell and methods are described in greater detail below and may be summarized in the Claims that follow the detailed description. These and other advantages of the present invention will become readily apparent from the detailed description of various embodiments below.

DETAILED DESCRIPTION

Figure 1:
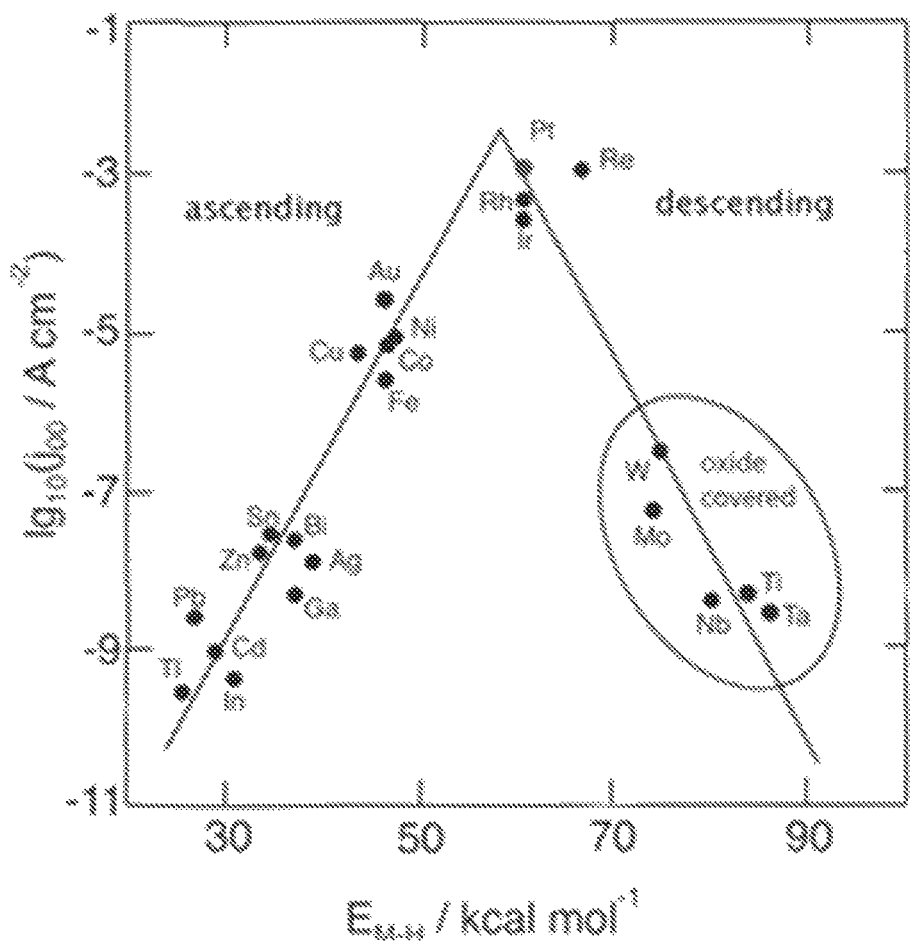
FIG. 1 is a graph showing hydrogen exchange current vs. hydride formation energy in acidic solution.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

Various embodiments are illustrated in the context of a printable multi-valent metal ion (e.g., $Zn^{2+}$) electrochemical cell, in which the metal ions travel through an electrolyte (e.g., a gel electrolyte). The skilled artisan will readily appreciate, however, that the materials and methods disclosed herein will have application in a number of other contexts where multi-valent (e.g., divalent or trivalent) or monovalent ion transport is applicable or desirable, and that other systems (based on monovalent or divalent ion transport, or other ion transport systems of higher valency) are also suitable for use in the present invention. This invention applies to structures that are deposited on foils, plastic substrates, fabrics (woven and nonwoven) and/or papers, as well as in cases where underlying and overlying elements have barrier properties to the outflow or inflow of species in the electrochemical cell. This invention may be useful in cases where the elements of the electrochemical cell are not impermeable to species in the electrolyte.

In this disclosure, the terms "negative electrode" and "anode" are used interchangeably, and use of one term generally includes the other, but both terms may be used to mean "anode." Likewise, the terms "positive electrode" and "cathode" are used interchangeably, and use of one term generally includes the other, but both terms may be used to mean "cathode." In this disclosure, the term "current collector" refers to a conductive element in contact with the anode or cathode. The term "alloy" as used her n may refer to a macroscopically uniform material that contains non-stoichiometric amounts of metals and other atoms that do not significantly adversely affect the electrical conductivity, such as silicon, nitrogen and carbon. Such alloys can benefit from reduced water splitting, reduced gassing and/or reduced interparticle or intermolecular contact resistance.

The present application describes novel schemes that introduce protective dopants into electrochemical cells. Protective plating, alloying or doping of certain metals or their oxides can promote reduced hydrogen generation and reduced water splitting, and can impede other detrimental reaction pathways in electrochemical cells, particularly in anodes. For example, in the present invention, an electrolyte, current collector or electrode precursor formulation can be supplemented with protective metal cation salts containing an anion in common with the anion in a working metal ion salt or ionic liquid salt. The combination of the protective metal salt (dopant with an anion in common with the anion in the working metal ion salt or ionic liquid salt may also be novel, in further combination with the anode (or collector) or not. The protective metal cation plates onto or alloys with a metal in the system (e.g., a metal or metal ion from the anode). The anion of the protective metal salt may complex with another working metal cation, such as a Zn cation in a zinc ion battery, through an ion exchange process. These exchange, plating and alloying processes can take place as an ink or slurry formulation is prepared (e.g., for those electrochemical cells that are made by printing or coating an ink or slurry), during the printing or coating of the battery components, over a storage period, or after forming or charging the electrochemical cell. In some cases, alloying can also improve electrode conductivity, possibly by limiting formation and/or reducing the robustness and/or impact of a resistance-increasing oxide or hydroxide layer on the electrode metal (which may involve forming a relatively conductive intermetal oxide on the surface of the electrode metal), providing a bridging metallic pathway between adjacent metal particles, and/or providing a sintering or electrical percolation enhancing agent.

An Exemplary Electrochemical Cell

Figure 2:
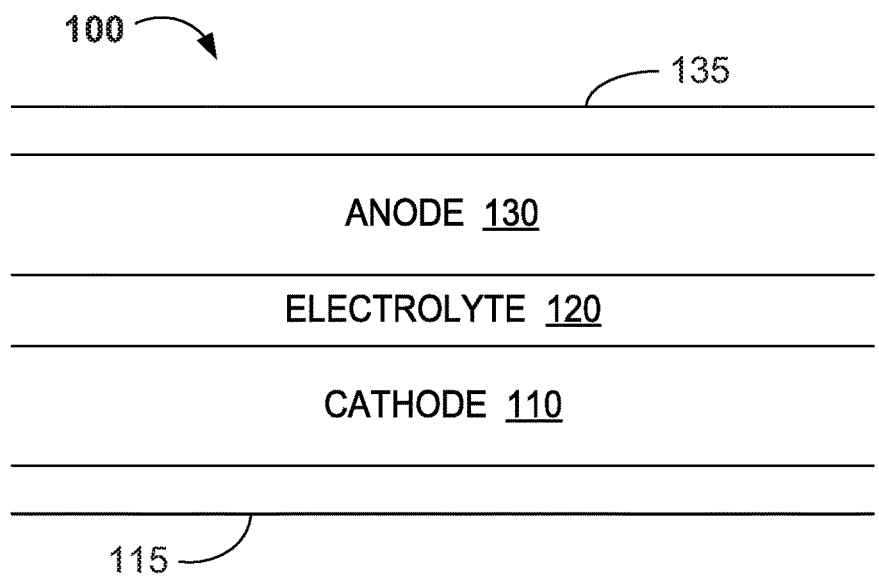
FIG. 2 shows a diagram of the layers in an exemplary electrochemical cell.

An example electrochemical cell 100 is shown in FIG. 2. The electrochemical cell 100 includes a cathode 110, an electrolyte layer 120, and an anode 130. The electrochemical cell 100 may further include current collectors 115 and 135, in physical and/or electrical contact with the cathode 110 and the anode 130, respectively. In one embodiment, each of the cathode 110, electrolyte layer 120, anode 130 and current collectors 115 and 135 are printed on a substrate (not shown). For example, all cell layers may be printed by stencil printing using an ink containing a volatile solvent (e.g., having a boiling point of <150° C., <100° C., or less than any other maximum temperature <150° C.), and dried in a convection oven (air) at a temperature and for a length of time sufficient to remove substantially all of the volatile solvent from the ink (e.g., 50-100° C. for 10-30 minutes).

The electrolyte 120 may include an electrolyte salt, an ionic liquid, and optionally, a polymer binder. In certain embodiments, the polymer binder (which may be cross-linked) and ionic liquid may form a gel. Advantageous formulations for the electrolyte 120 may also contain solvents, polymers and other additives that may replace some of the ionic species or the polymer binder. Molarities of the ionic liquid and, in the case of a multi-valent metal-based electrochemical cell, the multi-valent metal salt (considering only the fraction of the volume that contains the ionic liquid and soluble multi-valent metal salt) can vary from $10^{-1}$-1 M to 5 M (for either component or a composite mixture).

The electrolyte salt is largely conventional, and may be or comprise monovalent or multi-valent metal salt. Typically, the electrolyte salt has an anion that is identical or chemically similar to the anion of the ionic liquid.

Various cations and anions can be uniquely combined to form ionic liquids with specific physiochemical and electrochemical properties. Example mobile ionic species that may be included in an electrolyte and that can function as an ionic liquid include cation and anion combinations including one or more of the organic cations imidazolium, pyrrolidinium, pyridinium, tetraalkyl ammonium and piperidinium and/or one or more of the inorganic ions Li, Zn, Na, Al, Mn and Mg, and one or more anions such as organosulfonate (e.g., methanesulfonate [mesylate], trifluoromethanesulfonate [triflate], toluenesulfonate [tosylate], etc.), organosulfimide (e.g., bis((methyl)sulfonyl)imide [mesylate sulfimide, or MSI]), bis(trifluoromethylsulfonyl)-imide [TFSI]), sulfate, phosphate, organophosphate, organoborate (e.g., trialkyl borate, chelated organoborate, bis(oxalo)borate, etc.), tetrachloroborate, aluminate, dicyanamide, carboxylate (e.g., formate, acetate), perchlorate, nitrate and halide (e.g., chloride, bromide, iodide). Common ionic liquids containing various inorganic and organic anions and their properties include 1-butyl-3-methylimidazolium perchlorate, 1-butyl-3-methylimidazolium hydroxide, 1-butyl-3-methylimidazolium trifluoromethanesulfonate, 1-butyl-3-methylimidazolium methanesulfonate, 1-butyl-2,3-dimethylimidazolium methanesulfonate, 1-butyl-2,3-dimethylimidazolium trifluoromethanesulfonate, 1-butyl-1-methylpyrrolidinium methanesulfonate, 1-butyl-1-methylpyridinium methanesulfonate, 1-butyl-1-methylpyridinium trifluoromethanesulfonate, 1-ethyl-1-methylpyrrolidinium methanesulfonate, 1-ethyl-1-methylpyrrolidinium trifluoromethanesulfonate, 1-methyl-1-propyl-pyrrolidinium methanesulfonate, 1-ethyl-1-methylpyrrolidinium trifluoromethanesulfonate, 1-ethyl-3-methylimidazolium (EMIM) methanesulfonate, 1-ethyl-3-methylimidazolium (EMIM) hydroxide, 1-ethyl-3-methylimidazolium (EMIM) trifluoromethanesulfonate, 1-butyl-3-methylimidazolium (BMIM) formate, 1-butyl-2,3-dimethylimidazolium formate, 1-butyl-1-methylpyrrolidinium formate, 1-butyl-3-methylimidazolium acetate, 1-butyl-1-methylpyrrolidinium acetate, 1-butyl-1-methylpyrrolidinium trifluoromethanesulfonate, 1-butyl-1-methylpyrrolidinium tetrachloroborate, 1-butyl-1-methylpyridinium tetrachloroborate, 1-ethyl-1-methylpyrrolidinium tetrachloroborate, 1-ethyl-3-methylimidazolium tetrachloroborate, 1-ethyl-1-methylpyrrolidinium trifluoromethanesulfonate, 1-methyl-1-propylpyrrolidinium tetrachloroborate, 1-methyl-1-propylpyrrolidinium trifluoromethanesulfonate, 1-butyl-3-methylimidazolium propionate, 1-butyl-1-methylpyrrolidinium propionate, 1-butyl-3-methylimidazolium tetraphenylborate, 1-butyl-3-methylimidazolium bis(fluorosulfonyl)imide, 1-butyl-3-methylimidazolium bis(trifluoromethane)sulfonimide, 1-butyl-2,3-dimethyl-imidazolium tetraphenylborate, 1-butyl-2,3-dimethyllimidazolium bis(fluorosulfonyl)imide, 1-butyl-2,3-dimethylimidazolium bis(trifluoromethane)sulfonimide, 1-butyl-3-methylimidazolium bis(methylsulfonyl)imide, 1-butyl-2,3-dimethyllimidazolium bis((methyl)sulfonyl)imide, 1-butyl-3-methylimidazolium bis-((methyl)sulfonyl)amide, 1-butyl-1-methylpyrrolidinium bis((methyl)sulfonyl)imide, 1-butyl-1-methylpyrrolidinium bis(fluorosulfonyl)imide, 1-butyl-1-methyl-pyrrolidinium bis (trifluoro-methane)sulfonimide, 1-butyl-1-methylpyridinium bis(methylsulfonyl)imide, 1-ethyl-1-methyl-pyrrolidinium bis(methylsulfonyl)imide, 1-ethyl-1-methyl-pyrrolidinium bis(fluorosulfonyl)-imide, 1-ethyl-1-methyl-pyrrolidinium bis(trifluoromethane)sulfonimide, 1-ethyl-3-methylimid-azolium bis(methylsulfonyl)imide, 1-ethyl-3-methylimid-azolium bis(fluorosulfonyl)imide, 1-ethyl-3-methyl-imidazolium (EMIM) bis(trifluoromethane)-sulfonimide, 1-methyl-1-propyl-pyrrolidinium bis((methyl)sulfonyl)imide, 1-methyl-1-propylpyrrolidinium bis(fluorosulfonyl)-imide, 1-methyl-1-propylpyrroldinium bis(trifluoromethane)sulfonimide, 1-butyl-2,3-dimethyl-imidazolium bis((methyl)sulfonyl)amide, 1-butyl-2,3-dimethylimidazolium bis(fluorosulfonyl)-imide, 1-butyl-2,3-dimethylimidazolium bis(trifluoromethane)sulfonimide, 1-butyl-1-methyl-pyrrolidinium bis((methyl)sulfonyl)amide, 1-butyl-1-methylpyridinium bis(methyl sulfonyl)-amide, 1-butyl-1-methylpyrrolidinium bis(fluorosulfonyl)imide, 1-butyl-1-methylpyrrolidinium bis(trifluoromethane)sulfonimide, 1-ethyl-1-methylpyrrolidinium bis(methylsulfonyl)amide, 1-ethyl-3-methylimidazolium bis((methyl)sulfonyl)amide, 1-ethyl-1-methylpyrrolidinium bis-(fluorosulfonyl)imide, 1-ethyl-1-methylpyrrolidinium bis-(trifluoromethane)sulfonimide, 1-methyl-1-propylpyrrolidinium bis(methyl sulfonyl)amide, 1-methyl-1-propylpyrrolidinium bis(fluorosulfonyl)imide, 1-methyl-1-propylpyrroldinium bis(trifluoromethane)sulfonimide, 1-butyl-3-methylimidazolium propionate, and 1-butyl-1-methyl-pyrrolidinium propionate.

Example polymers that may be useful as a binder in the present electrolyte (as well as in an electrode and/or a current collector) include polymers and copolymers of trifluoroethylene, tetrafluoroethylene, vinylidene chloride, vinylidene difluoride (difluoroethylene), hexafluoropropylene, styrene, butadiene, ethylene oxides, acrylate and/or methacrylate esters, variations and rubbers thereof, etc., as well as polyesters, polyanilines, polyethers, polyimides, copolymers and blends thereof, etc. The polymer may be linear, branched or cross-linked.

The solvent is generally included in an amount that is more than 10% by weight (e.g., 20-80% by weight, or any value or range of values that is more than 10% by weight) of the mixture of components (e.g., the binder, ionic liquid and the electrolyte salt) in the electrolyte. Example solvents that may be useful in the present electrolyte (as well as in an electrode, a current collector and/or an ink therefor) may include mono-, di- and/or trialkyl- and/or -arylamines and aqueous salts thereof, N-methylpyrrole, N-methylpyrrolidone (NMP), N-methylpyrrolidine, N-methylpiperidine, N-methylimidazole, pyridine, organophosphates and aqueous salts thereof, halogenated alkanes, cycloalkanes and arenes, combinations thereof with water, etc. Mixtures of such solvents with other high boiling point solvents (including polar solvents having a boiling point at 1 atm of >150° C., >200° C., or >250° C.) can also be included. The solvent is generally included in an amount that is more than 10% by weight (e.g., 20-80% by weight, or any value or range of values that is more than 10% by weight) of the mixture of components (e.g., the binder, ionic liquid, electrolyte salt, and solvent) in the electrolyte.

Example ion transport-enhancing species that may be present in the electrolyte and/or electrodes include materials and/or additives such as carbonates (e.g., ethylene carbonate, propylene carbonate, and linear alkyl carbonates), glycerol carbonates, glycols (e.g., ethylene glycol, diethylene glycol, polyethylene glycols, propylene glycol and oligomers thereof), sugar alcohols and polyols, ethylene oxides, propylene oxides, polymers and copolymers of ethylene and propylene oxides, ethers, fluorinated carbonates, and fluorinated ethers. Such ion transport-enhancing species having lone pairs of electrons (e.g., carbonates) can form hydrogen bonds with ionic liquid anions or cations having hydroxyl, amine or sulfhydryl groups, and ion transport-enhancing species having hydroxyl groups (e.g., glycols) can form hydrogen bonds with ionic liquid anions or cations having lone pairs of electrons.

Example electrode compositions to which the binder, ionic liquid and/or additive can be added include metal oxides and transition metal oxides such as $MnO_2$, vanadium oxide, cobalt oxides, ternary metal oxides (e.g., $Zn_xMn_{1-x}O_y$, $Ni_xMn_{1-x}O_y$, $Co_xMn_{1-x}O_y$, nickel-manganese-cobalt oxides (NCM), nickel-zinc-manganese oxides, zinc-manganese-cobalt oxides, etc.), spinel oxides, titanium dioxide, etc. Such metal oxides may be conductive in their native state or after conventional doping. The electrode composition may further include a polymer that can function as an ionic vehicle or electronic conductor (in addition or as an alternative to the polymer binder).

The anode 130 in the present electrochemical cell 100 may comprise or consist essentially of an elemental metal. The elemental metal may be one providing monovalent ions (e.g., $Li^+$, $Na^+$, $Cu^+$, AO or polyvalent ions (e.g., $Zn^{2+}$, $Ni^{2+}$, $Al^{3+}Ga^{3+}$, $Co^{3+}$, $Ca^{2+}$, $Mg^{2+}$, etc.). The cathode 120 in the present electrochemical cell 100 may comprise or consist essentially of a metal oxide, and more particularly a transition metal oxide (e.g., containing a metal from the $4^{th}$ row of the Periodic Table of the Elements). For example, the cathode 120 may comprise or consist essentially of $MnO_2$, $NiO_2$, $V_2O_5$, $FePO_4$, $CoO_2$, $Cr_2O_3$, etc.

In one particularly advantageous embodiment, the electrochemical cell is a Zn battery (e.g., containing a zinc anode). Zn batteries generally have a high efficiency (e.g., on the order of 99%), and any Zn deposition on Zn metal electrodes or current collectors is reversible, especially in non-aqueous Zn electrolytes. The activation barrier energy for $Zn^{2+}$ ion migration in a Zn battery is relatively low in a variety of cathode materials (e.g., $MnO_2$, $NiO_2$, $V_2O_5$, $FePO_4$, etc.). $Zn^{2+}$ ions have an ionic radius similar to $Li^+$ and $Mg^{2+}$. In addition, the volumetric capacity of a Zn battery is higher than batteries based on other multi-valent metals (e.g., Ca, Mg). It is sometimes the case, however, that a conventional Zn battery can have a low discharge rate due to relatively low anode dissolution kinetics (in turn, due to a low anode surface area). Low surface areas must be maintained in conventional cells in order to minimize gassing reactions at the anode, which can shorten cell charge retention (such as in long shelf-life Zn primary cells). This also presents a problem for cells containing a printed Zn anode, in that printing and coating techniques such as screen printing, flexographic printing, gravure printing, slot die coating, tape casting, blade coating and other related techniques can deposit more uniform and less defective anode films when using relatively small particles (e.g., <10 microns, and in some cases, <5 microns). Such small particle sizes, however, lead to high anode surface areas and relatively (and usually unacceptably) high gas-forming reaction rates. The present invention enables formation of electrochemical cells with printed or coated anodes that achieve a high discharge rate and that have a high surface area and acceptably low gassing.

Formulations for the current collectors 115 and 135 may be based on ~70% conductor loading by volume or weight, but lower percentages may also be possible, as well as composites of different metals, carbon, graphite, carbon nanotubes (CNT), graphene, etc. The same formulations can also be used for the anode 130, such as a Zn powder-based printed anode layer, using the densities of Zn and any binders and/or additives present. A similar formulation can be used for the cathode 110, substituting, for example, the densities and molecular weights of $MnO_2$ or other metal oxide and adding a set of fields and data for conductive additives, such as carbon AB and graphite, which can be used in cathode formulations. One feature of these formulation calculations is that they maintain the same concentrations of ionic species in the electrolyte 120 and in other layers in the battery.

Increasing electrolyte concentration and electrolyte conductivity, and in some cases, electrode ionic conductivity and suppression of out-diffusion of ionic electrolyte components into adjacent layers in a layered battery cell structure is of particular interest when the adjacent electrode and current collector layers may contain regions which have some solubility or provide a mobile path for diffusion or drift of ionic species into these layers that can ultimately reduce the ionic conductivity and performance of the cell (see, e.g., U.S. Pat. No. 9,276,292, the relevant portions of which are incorporated herein by reference). An example system where this occurs is a cell based on a polymer electrolyte that contains one or more mobile ionic species such as an ionic liquid, a metal salt, an organic salt (e.g., other than the ionic liquid) and/or an ionic complexing agent. When such electrolyte layers are surrounded by electrode or current collector layers that contain materials that have a finite solubility for the ionic or solvating species in the electrolyte, these species and/or materials can diffuse into the other layers. Certain active materials and polymer binders may have a finite solubility for these species.

The present formulations may also be used with solid inorganic electrolytes, alone or combined with semipermeable or ionic soluble electrode and/or current collector compositions.

Surface Modification of Anode Metal by Metal Displacement Reaction

The current disclosure attempts to address issues relating to anode-related cell degradation (e.g., zinc corrosion) through modification of the electrode (and, more particularly, the anode), the current collector(s) and/or the electrolyte. The current disclosure involves addition of desired inorganic species (namely indium, bismuth, aluminum, gallium, tin and/or silver) to the surface of zinc particles in a porous or non-porous (and optionally printed) zinc anode via a metal displacement reaction. The metal displacement reaction contemplated is sometimes referred to as a "single-displacement reaction" or a "single-replacement reaction." This can be achieved by addition of, for example, indium, bismuth, aluminum, gallium and/or silver salts at desired and/or predetermined concentrations into the anode ink, the collector(s) (e.g., the current collector in contact with the anode) and/or the electrolyte. With the protective metal ions (e.g., $In^{3+}$, $Bi^{3+}$, $Al^{3+}$, $Ga^{3+}$, $Sn^{2+}$, $Sn^{4+}$, and possibly $Ag^+$) in a solution or suspension in contact with zinc anode metal, for example, a zinc metal atom can spontaneously dissolve and be replaced by the less reactive protective metal ions, which are reduced to metal atoms and plated onto the zinc surface. This differs from other routes of incorporating different metal species in the electrode, such as by using particles of zinc amalgam or zinc alloys, or mixing in foreign particles (e.g. $In_2O_3$) with the zinc metal particles in the ink or paste used to form the anode.

The anion of the protective metal salt can be selected to match the other anions of the electrochemical system to reduce the likelihood of new side reactions stemming or resulting from the addition of a non-common anion. The protective metal salt can also provide some additional control or functionality (e.g. pH control, solubility, secondary reaction). Adding the protective metal salt to an ink for forming an anode or a current collector in contact with the anode at a higher concentration than is present in the electrolyte may be preferred, as it may enable full surface coverage of all zinc particles with the protective metal. On the other hand, adding the protective metal salt to the electrolyte may result in more of a gradient of surface coverage, with surface concentration decreasing through the thickness of the anode (away from the electrolyte) due to diffusion limitations or reduced driving forces once the first "layers" of zinc have been covered. On the other hand, adding the protective metal salt to the electrolyte may keep a reservoir of protective metal species in the electrolyte, enabling more displacement reactions and surface doping after fresh zinc has been deposited in the anode following a battery charging process.

Figure 3:
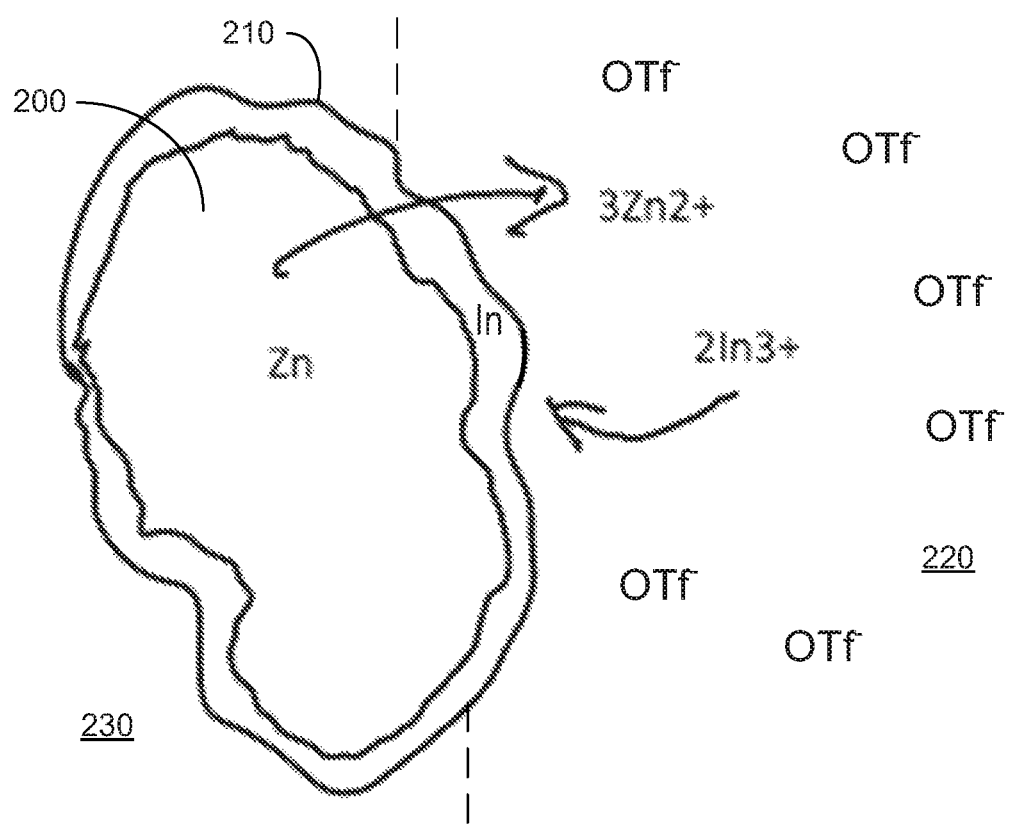
FIG. 3 shows a zinc anode particle with an indium-rich outer layer resulting from ion exchange between $In^{3+}$ compensation ions (from indium triflate) in the electrolyte and Zn atoms from the anode particle.

For example, FIG. 3 shows a zinc anode particle 200 with a protective and/or contact resistance-reducing indium-rich outer layer 210 resulting from ion exchange between indium ions ($In^{3+}$) in the electrolyte 220 and Zn atoms from the anode particle 200. The indium ions are from indium triflate ($InOTf_3$) added to the electrolyte 220. An interface between the electrolyte 220 and the anode 230 is arbitrarily indicated by the dashed lines in FIG. 3. In the example shown in FIG. 3, the zinc anode is somewhat porous, and may comprise a network of linked particles such as zinc particle 200. The electrolyte 220 and species dissolved therein (such as $Zn^{2+}$, $In^{3+}$ and $OTf^-$ ions) may circulate somewhat freely in the open spaces between zinc particles in the anode 230.

As described herein, the indium-rich outer layer 210 can reduce (i) contact and/or interparticle resistance, (ii) build-up of blocking nonconductive oxides, (iii) hydrogen generation, (iv) water splitting, and possibly (v) other detrimental reaction pathways in the electrochemical cell. A steady-state ratio of indium to zinc in the indium-rich outer layer 210 may be from 1:100 to 100:1, or any value or range of values therein (e.g., from 1:1 to 100:1), depending on the amount and/or concentration of indium added to the electrolyte 220.

Figure 4:
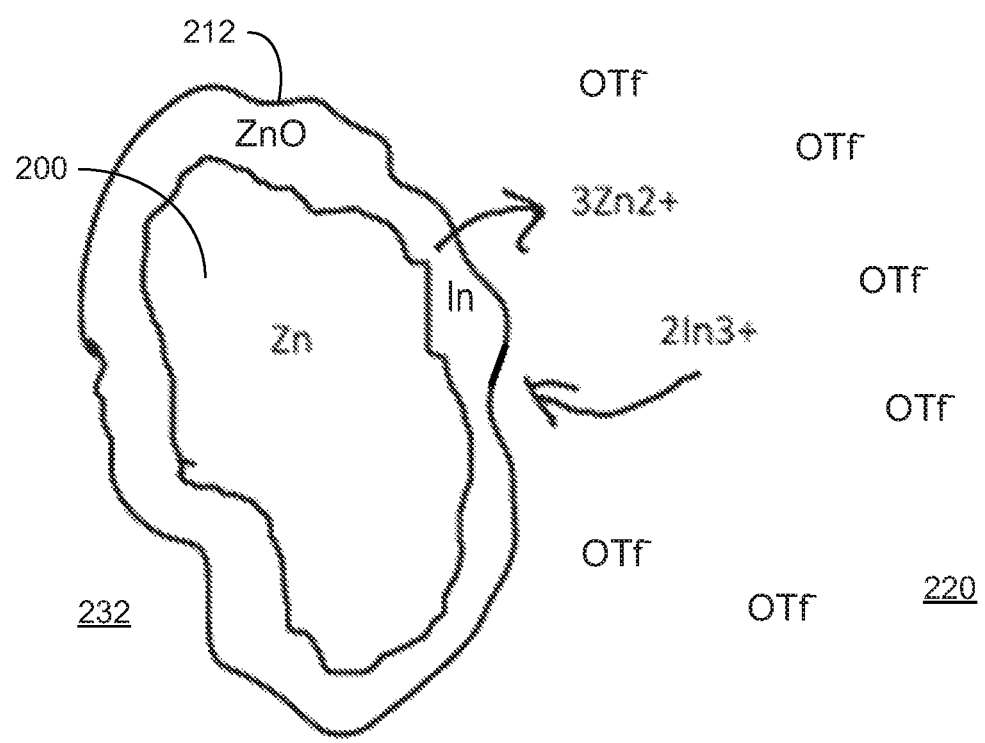
FIG. 4 shows a zinc anode particle with an indium rich outer oxide layer resulting from ion exchange between $In^{3+}$ compensation ions in the electrolyte and Zn atoms from the anode particle.

FIG. 4 shows a zinc anode particle 200 similar to that in FIG. 3, with an indium-rich outer oxide layer 212 resulting from ion exchange between indium ions ($In^{3+}$ from $InOTf_3$) added to the electrolyte 220 and Zn atoms from the anode particle 200. A zinc oxide coating may form on the zinc particles 200 in the zinc anode when the zinc particles are exposed to oxygen (e.g., during manufacturing or processing, or by leakage and/or water splitting during storage and/or use). In addition to zinc oxide, zinc hydroxide may be present in the oxide layer 212. In the case of FIG. 4, the indium-doped zinc oxide 212 that is formed may be more conductive than zinc oxide, and in some cases, by one or more orders of magnitude. Under some conditions, the indium-doped zinc oxide 212 may be non-stoichiometric (e.g., having a formula $In_xZn_{1-x}O_y$, where y may be less than $[1+3x/2]$). Similar to the example of FIG. 3, a steady-state ratio of indium to zinc in the indium-rich outer oxide layer 212 may be from 1:100 to 100:1, or any value or range of values therein (e.g., from 1:1 to 100:1), depending on the amount and/or concentration of indium added to the electrolyte 220.

Figure 5:
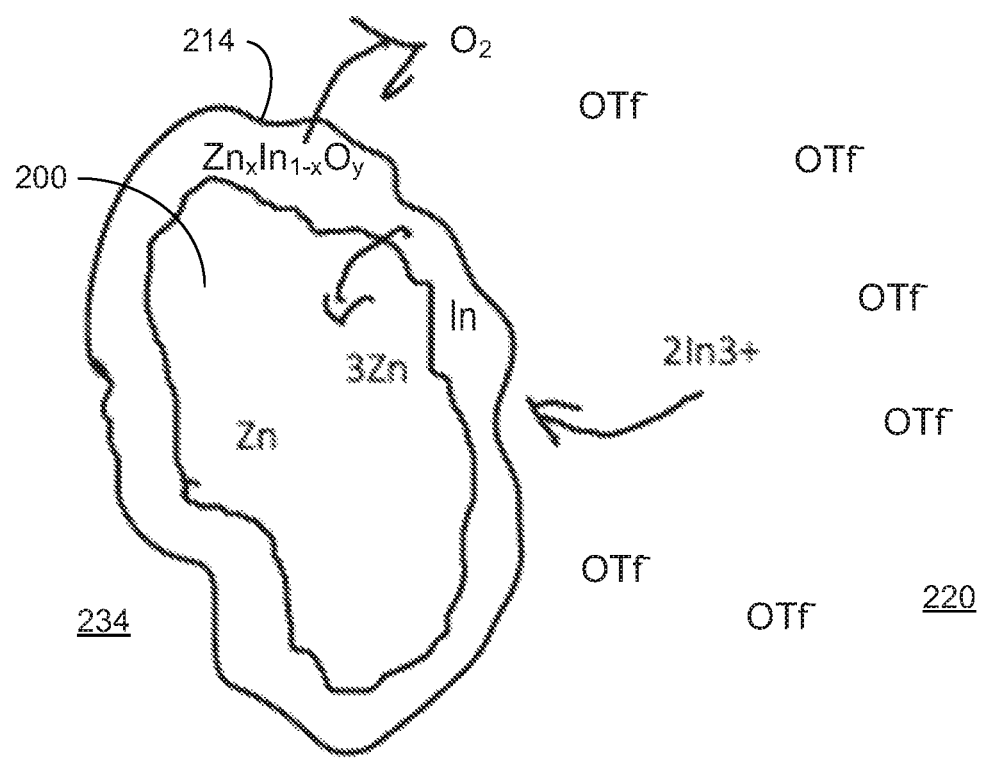
FIG. 5 is a diagram of a reaction resulting in indium incorporation into an oxide coating of an anode particle, along with reduction of the oxide coating, producing excess oxygen and Zn metal.

FIG. 5 shows a zinc anode particle 200 with an oxide coating 214 thereon, similar to the example of FIG. 4. The arrows indicate reactions resulting in indium incorporation into the oxide coating 214 along with a reduction of the mixed-metal oxide in the coating 214, producing excess oxygen ($O_2$) and Zn metal, which may migrate from the oxide coating 214 into the anode particle 200. The native zinc oxide (ZnO) in the oxide coating 214 may also be reduced under certain conditions to produce oxygen and/or Zn metal. The Zn metal may also remain in the oxide coating 214 and increase conductivity through a doping effect (e.g., in species of the formula $Zn_xIn_{1-x}O_y$).

Figure 6:
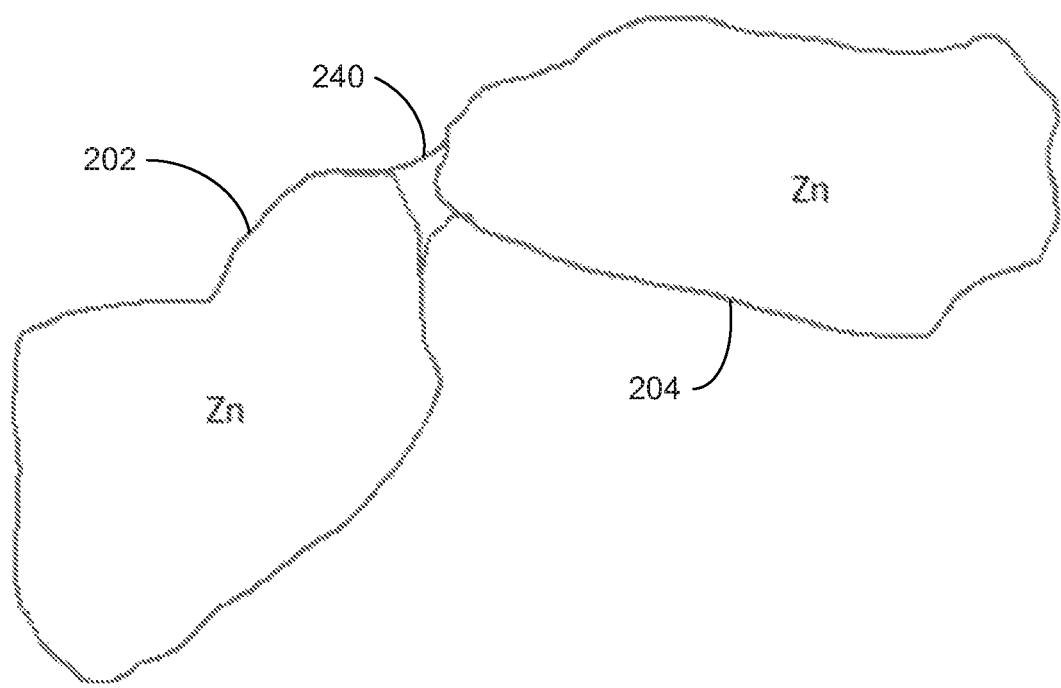
FIG. 6 is a diagram of two anode particles with a conductivity-enhancing metallic bridge that may be formed at least in part as a result of an added metal salt.

FIG. 6 shows two anode particles 202 and 204 with a conductivity-enhancing metallic bridge 240 that may be formed as a result of the metal ions of a protective metal salt added to the electrolyte or to the ink or paste for making the anode. In one instance, the metallic bridge 240 may be formed by local melting during processing or use, due to formation of an alloy (e.g., Sn/Zn, Zn/In or Zn/Al/In) that may have a lower melting point than the metal of the anode particles 202 and 204 (e.g., Zn). The bridge 240 may also be formed as a result of enhanced wetting and/or increased surface energy lowering of the electrochemical system (and/or more specifically of the anode particles 202 and 204 in the anode) by the localization of binder, dopant, metal and/or electrolyte agents (e.g., in the electrolyte) at the high surface-area contact region between two particles (see, e.g., region 242 in FIG. 7). The contact region may be enhanced by a local volumetric increase in metal content and/or volume resulting from ion exchange of metals of different oxidation states (as described herein) and/or local wetting of the high surface area interparticle contact region.

Figure 7:
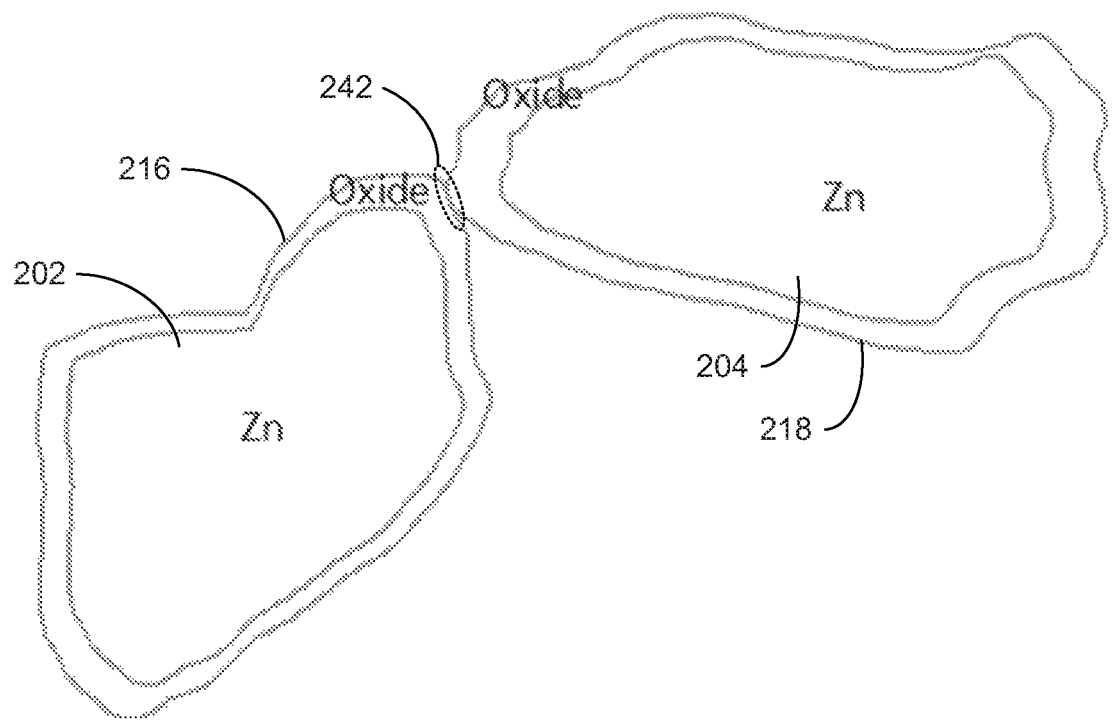
FIG. 7 shows the contact region of outer oxide layers on zinc anode particles enhanced by addition of a metallic salt that has a higher electrical conductivity than the native zinc oxide.

FIG. 7 shows two anode particles 202 and 204 with oxide surfaces 216 and 218, respectively, having a contact region 242 with improved electrical conductivity therebetween. The contact region 242 may be enhanced by the mixed metal oxide coatings 216 and 218, resulting from addition of a protective metallic salt as described herein. The mixed metal oxide coatings 216 and 218 may result from incorporation of the protective metal ions from the added metal salt into the oxide, plating and then oxidation of the protective metal ions from the added metal salt, or surface-segregation of either the native metal from the particles 202 and 204 or the plated protective metal ions. The mixed metal oxide coatings 216 and 218 (e.g., $In_2O_3$:ZnO, $SnO_2$:ZnO, etc.) can have a higher electrical conductivity or be less passivating than the oxide(s) of the native metal(s) (e.g., $In_2O_3$, ZnO, $SnO_2$, etc.). Alternatively, the native oxide(s) may undergo homogenous and/or local doping of the anode particle oxide with conductivity-enhancing and/or melting point-reducing agents ($In^{3+}$, $Sn^{4+}$) from a protective metal salt precursor.

Additional Components for Protective Metal Deposition onto or Incorporation into Metal Anode Particle Surfaces It may also be advantageous to further introduce synergistic additives to increase the effectiveness of the protective metal salt additives (e.g., salts of indium, bismuth, cadmium, tin, aluminum, etc. that may have the same or chemically similar anion as the ionic liquid and/or electrolyte salt) on increasing the hydrogen overpotential of a zinc or other metal anode in a rechargeable battery system. Direct addition of protective metal (e.g., indium, bismuth, cadmium, tin, gallium, aluminum, etc.) salts to the electrolyte or metal electrode (e.g., zinc anode) in a rechargeable battery system can begin to lose effectiveness over time, as the protective metal may be repeatably plated over with the metal of the metal electrode (e.g., zinc). In order to maintain the surface concentration of the protective metal(s) on the anode or current collector in contact with the anode, one or more chelating agents may be added (e.g., to the electrolyte, anode, and/or current collector in contact with the anode) to maintain the concentration of protective metal ions in solution and at the interface with the anode (or metal particles in the anode) over repeated anode metal deposition steps.

Exemplary chelating agents may include compounds such as polyalcohols (e.g., glycols such as ethylene glycol, propylene glycol, etc., glycerol, etc.), polyamines (e.g., ethylene diamine, propylene diamine, bis(1,2-dialkylamino)ethanes, bis(1,3-dialkylamino)-propanes, etc.), polyethers (e.g., linear or branched polyethers such as ethylene glycol dimethyl ether, propylene glycol dimethyl ether, diglyme, triglyme, etc., cyclic polyethers such as dioxane, etc.), crown ethers, bis(dialkyl- and diarylphosphino)alkanes and arenes, aliphatic (i.e., alkanoic and/or aryl) diacids and diesters (such as oxalic acid, dimethyl oxalate, malonic acid, dimethyl malonate, o-phthalic acid, etc.), diketones such as propane-2,4-dione, etc.

As some of the protective metals are in an oxidation state of +3 or more, they may be more tightly bound to the anode particle or oxide surface thereof than the metal of the anode particle (e.g., zinc) when it has a lower oxidation state (e.g., +2). By adjusting the concentration and/or identity of the chelate ligands, the concentration of the protective metal salts (e.g., in the electrolyte, interparticle spaces in the anode and/or adjacent current collector, etc.) can be maintained over multiple cycles.

Advantages Of The Invention

It can be difficult or costly to produce anode alloys or anode particles with surface coatings including a protective metal. The approach described in the present application provides a simple and inexpensive technique for introducing a protective metal salt into an ink or precursor mixture for an anode, current collector, or electrolyte that does not require any additional specialized equipment or separate process steps.

The present approach, when using a common anion with another species in the electrolyte or binder (e.g., triflate, bis[trifluoromethylsulfonyl]imide, bis[fluorosulfonyl]imide, etc.) may avoid introducing a new species into the electrochemical cell other than the protective metal ion, which can reduce or avoid unwanted side reactions or a higher content of inert species into the electrolyte, binder, or other component of the cell.

With metal cation exchange, where the protective metal cation plates out or forms an oxide (e.g., on the surface of the anode metal particles), the anion of the protective metal salt can complex with a working cation of the electrochemical cell (e.g., Zn, Al or Li) to maintain ionic conductivity or reactivity of the cell. The working cation can be dissolved and/or oxidized from the anode metal itself.

A coating on an anode particle with a protective metal therein may lose some efficacy upon secondary cycling of the battery, which may coat the protective coating with metal from the anode and result in some loss of the protective coating and/or its beneficial properties. However, the presence of the protective coating during fabrication or storage prior to first use may be advantageous, and the loss of the coating may result in improved cycling behavior if the cycling behavior and/or electrode reactivity (e.g., for cell function) is reduced or adversely affected by the presence of the protective additives (e.g., the protective metal salt and/or chelating agent). In applications such as disposable health sensors or short-term asset tracking that are powered by small batteries, the benefit in terms of shelf life may substantially outweigh any loss in cycling performance, as there may be a limited need for charge and/or discharge cycling stability, and the charging and discharging of the battery may take place over a significantly shorter period of time than the initial storage period.

The addition of a protective metal salt and optional chelating agent may be particularly advantageous in printed or coated cells that use particle-based collector layers, as the collector layers can also contain high surface-area sites for hydrogen generation and water or electrolyte breakdown. The protective metal salt can also plate the current collector(s) with protective and hydrogen evolution-decreasing metal(s).

EXAMPLES

In various examples, the materials and compositions useful for protecting a porous metal anode may include a binder or electrolyte containing 0.1-2M Zn triflate electrolyte salt in EMIM OTF ionic liquid, and a polymer such as PVDF-co-HFP and an amount of a protective metal salt such that the concentration of protective metal atoms or ions is from 50 to 10,000 ppm, more preferably from 50 to 1000 ppm and more preferably from about 100 to about 300 ppm in the total electrolyte composition.

Examples of protective metal salts for porous metal anodes such zinc anodes include indium (III) triflate, bismuth (III) triflate, aluminum (III) triflate, tin (II) triflate, indium (III) FSI, bismuth (III) FSI, aluminum (III) FSI, tin (II) FSI, indium (III) TFSI, bismuth (III) TFSI, aluminum (III) TFSI, and tin (II) TFSI.

Other Concepts and Inventive Ideas Related to this Invention

The concepts herein extend not only to porous anodes and electrolytes, but also to current collectors, especially printed and coated anodes and current collectors in electrochemical communication or contact with such anodes. Printed current collectors are relatively rare, as foil collectors are typically used in the battery industry (although the present invention is applicable to electrochemical cells including a foil current collector). Electrolyte doping to prevent diffusion, swelling, and function loss in electrodes and current collectors (e.g., from components in the electrolyte; see, e.g., U.S. Pat. No. 9,276,292, the relevant portions of which are incorporated herein by reference) may be useful, since printed conductors (such as elemental metal anodes) are typically metal particles in a matrix that may have a solubility and/or permeability for species in the electrolyte that should remain in the active regions of the battery. Also, since it may be advantageous to dope the electrodes with such electrolyte components, issues may arise as a result of loss of those dopants to the next adjacent layer (e.g., the current collector).

Certain current collector metals/conductors and conductive additives added to electrodes may catalyze or increase water splitting or gassing. Examples of such collector conductors and electrode additives include Ag, carbon black, carbon nanotubes and graphene. Some conductive additives may contain levels of Fe or other gas-enhancing impurities. Such current collector metals/conductors and conductive additives may be passivated (or, in the case of conductive additives, may be plated or alloyed) with the protective metal salts disclosed herein (e.g., by exposure to the protective metal salts during processing, post processing treatment, forming, storage or operation of the electrochemical cell) to reduce water splitting or gassing.

Manganese metal (Mn) can be present in the electrochemical cell, for example either in the cathode or by partial dissolution of the cathode. $MnO_2$ (which can form as a result of oxidation of Mn metal) is known to be an active water splitting catalyst. The presence of $MnO_2$ may be advantageously counteracted by the present protective metal salt(s).

Cross-linking of the dopant(s) and/or other species in a binder network in an electrode and/or current collector can stabilize the motion of the dopant and/or other species, preventing them from transporting in or out of the cell, and thereby stabilizing their blocking effect on the outflow of ionic and solvating species from interior layer(s) in the cell (e.g., the electrolyte and/or electrodes). Furthermore, use of polymer-tethered counterions (e.g., in the protective metal salt) in printed and/or coated electrochemical cell layers may suppress out-diffusion of anions from the electrolyte layer, an electrode and/or a current collector.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An electrochemical cell, comprising:
a positive electrode;
a negative electrode, comprising an elemental metal or a metal alloy; and
an electrolyte, comprising an electrolyte salt and an ionic liquid, the electrolyte disposed between and providing ionic exchange between the positive electrode and the negative electrode,
wherein at least one of the electrolyte or the negative electrode further comprises a first metal of a first protective metal salt, configured to (i) reduce or eliminate hydrogen evolution or one or more open circuit side reactions in the electrochemical cell, or (ii) plate out onto or combine with the elemental metal or the metal alloy, and
wherein the first metal of the first protective metal salt is at least one of indium, bismuth, gallium, or silver.

2. The electrochemical cell of claim 1, wherein the elemental or the metal alloy of the negative electrode comprises zinc, lithium, aluminum, nickel, or copper.

3. The electrochemical cell of claim 1, wherein the positive electrode comprises a first current collector, and wherein the negative electrode comprises a second current collector, the second current collector being porous.

4. The electrochemical cell of claim 3, wherein the first protective metal salt dopes the second current collector.

5. The electrochemical cell of claim 1, wherein the electrolyte of the electrochemical cell is printed.

6. The electrochemical cell of claim 1, wherein at least one of the positive electrode, the negative electrode, or the electrolyte comprises a solvent comprising a $C_1$-$C_4$ monoalkylamine, di-alkylamine, trialkylamine, N-methylpyrrole, N-methyl pyrrolidine, N-methylpyrrolidone, N-methylpiperidine, N-methylimidazole, pyridine, or an aqueous salt thereof.

7. The electrochemical cell of claim 1, wherein the first metal of the first protective metal salt is indium or tin.

8. The electrochemical cell of claim 1, wherein the first protective metal salt comprises at least one of indium triflate, tin triflate, or bismuth triflate.

9. The electrochemical cell of claim 1, wherein the first protective metal salt is a part of the electrolyte and comprises indium triflate.

10. The electrochemical cell of claim 9, wherein the elemental metal or the metal alloy of the negative electrode comprises zinc.

11. The electrochemical cell of claim 1, wherein the first protective metal salt comprises at least one of indium FSI, bismuth FSI, tin FSI, indium TFSI, bismuth TFSI, or tin FFSI.

12. The electrochemical cell of claim 1, wherein a concentration of the at least one of the first metal in the electrolyte is between 50 ppm and 10,000 ppm.

13. The electrochemical cell of claim 1, wherein the electrolyte comprises a polymer binder.

14. The electrochemical cell of claim 1, wherein at least one of the electrolyte or the negative electrode further comprises a second metal of a second protective metal salt, wherein the second metal is different than the first metal.

15. The electrochemical cell of claim 14, wherein the second protective metal salt is selected such that the second metal, when alloyed with a component the negative electrode, reduces a melting point of the component.

16. The electrochemical cell of claim 1, wherein the positive electrode comprises one of $MnO_2$, $NiO_2$, $V_2O_5$, $FePO_4$, $CoO_2$, or $Cr_2O_3$.

17. An electrochemical cell, comprising:
a positive electrode;
a negative electrode, comprising an elemental metal or a metal alloy;
an electrolyte, comprising an electrolyte salt and an ionic liquid;
a first current collector, in electrical contact with the positive electrode; and
a second current collector, in electrical contact with the negative electrode,
wherein at least one of the electrolyte, the negative electrode or the second current collector further comprises a metal of a protective metal salt, and
wherein the metal of the protective metal salt is at least one of indium, bismuth, gallium, or silver.

18. The electrochemical cell of claim 17, wherein the elemental metal or the metal alloy of the negative electrode comprises zinc, lithium, aluminum, nickel, or copper.

19. The electrochemical cell of claim 17, wherein the electrolyte of the electrochemical cell is printed.

20. The electrochemical cell of claim 17, wherein at least one of the positive electrode, the negative electrode, or the electrolyte comprises a solvent comprising a $C_1$-$C_4$ monoalkylamine, di-alkyamine trialkylamine, N-methylpyrrole, N-methyl pyrrolidine, N-methylpyrrolidone, N-methylpiperidine, N -methylimidazole, pyridine, or an aqueous salt thereof.

* * * * *